March 21, 1967  R. M. CUTHBERT  3,309,920
TORSION MONITORING APPARATUS
Filed June 2, 1964  2 Sheets-Sheet 1
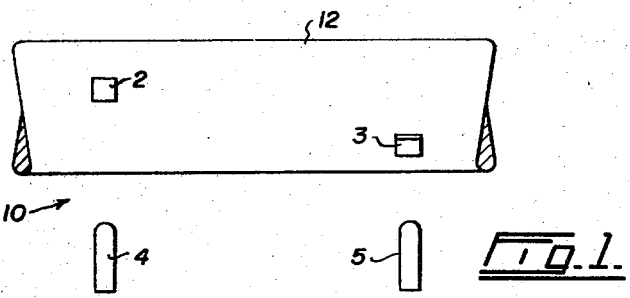
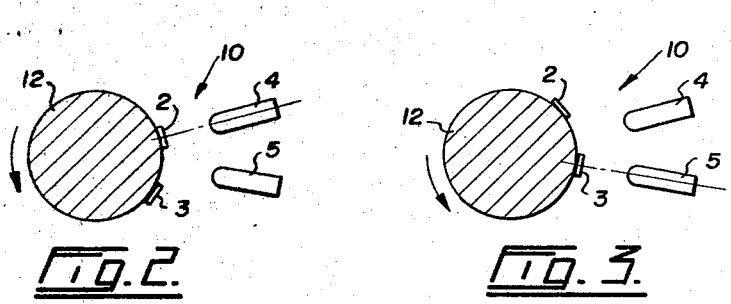
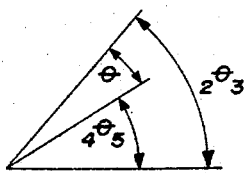
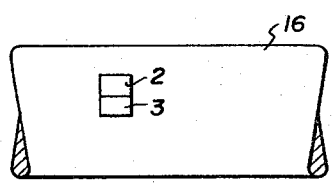
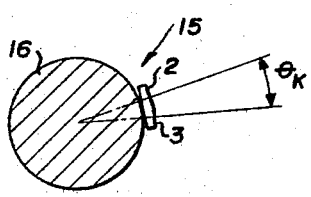
INVENTOR
ROBERT M. CUTHBERT
BY
Fetherstonhaugh&Co.
ATTORNEYS

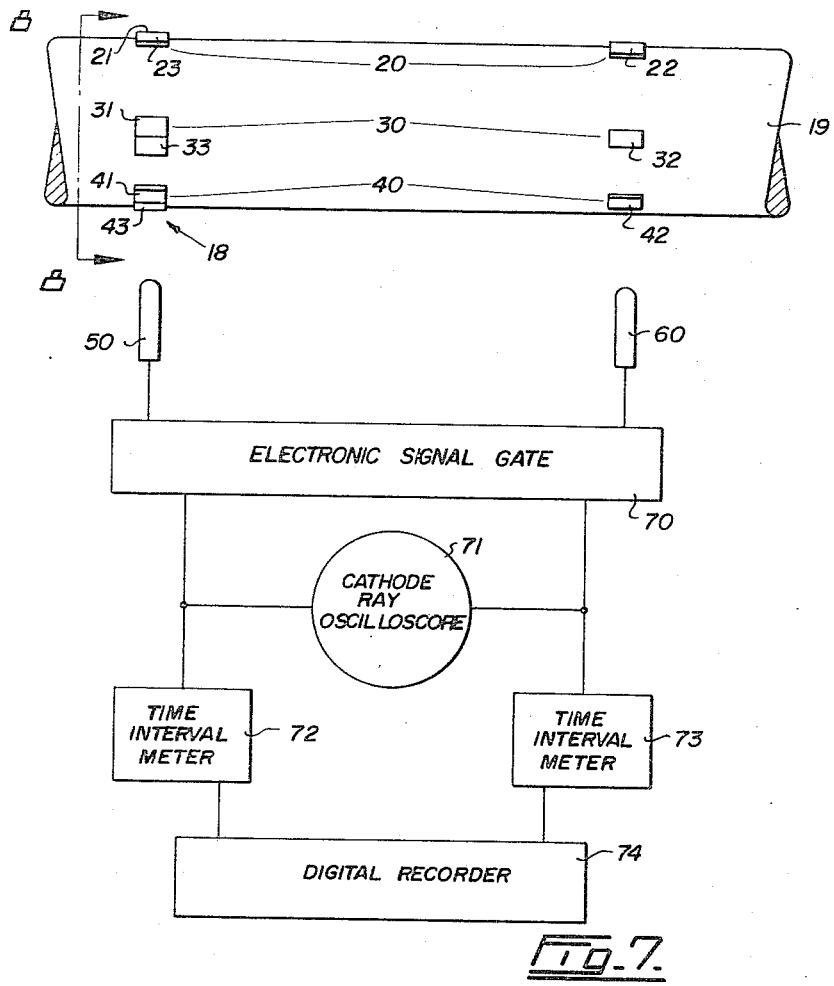
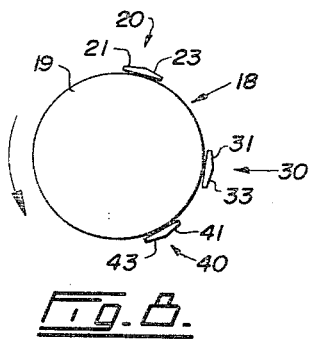

United States Patent Office 3,309,920
Patented Mar. 21, 1967

3,309,920
TORSION MONITORING APPARATUS
Robert M. Cuthbert, Ladner, British Columbia, Canada, assignor to British Columbia Research Council of the University of British Columbia, Canada
Filed June 2, 1964, Ser. No. 371,950
1 Claim. (Cl. 73—136)

This invention relates to apparatus for monitoring torsional phenomena of rotating shafts under conditions of varying speed and torque.

An object of the present invention is the provision of apparatus for measuring torque pulsations of short duration in a rotating shaft.

Another object is the provision of a torsion monitoring apparatus that can be operated without contacting the shaft and while it continues to perform its regular job, and which includes a low mass, low inertia radiator assembly mounted on the shaft without interferring with the normal rotation thereof.

Another object is the provision of apparatus of the type described which produces signals during rotation of the shaft which may be directly recorded by digital techniques without loss of accuracy.

A still further object is the provision of apparatus including means for creating electrical pairs of signals from two axially spaced points on a rotating shaft, and means for measuring the time interval between the signals of pairs thereof, said time intervals between signals being functions of the torsional displacement of the shaft. The apparatus preferably includes means for simultaneously creating second pairs of signals at two angularly spaced points in a common rotational plane on said rotating shaft, and means for measuring time intervals between signals of second pairs thereof, said second pair time intervals being functions of the rotational velocity of the shaft indicating time intervals for predetermined angular displacements of the shaft.

The main elements are radiators mounted on the shaft at the points from which the signals are to be generated, and sensors activated by the radiators to generate said signals. The radiators may be energized by suitable energizing sources either spaced from the shaft or on the shaft, or they may include in themselves the sources or be the sources. It is, however, preferred to have the sources off the shaft. For example, the radiators may be reflectors used with light sources on or off the shaft. The sensors used with the reflectors may also include the light sources.

In the accompanying drawings,

FIGURE 1 diagrammatically illustrates one form of torque monitoring apparatus associated with a shaft, FIGURE 2 is a diagrammatic sectional view showing the apparatus at the instant of the generating of one electrical signal, FIGURE 3 is a view similar to FIGURE 2 showing the apparatus at the instant of generating a second electrical signal, FIGURE 4 diagrammatically illustrates the angles measured by this apparatus, FIGURE 5 diagrammatically illustrates part of another form of the torque monitoring apparatus, FIGURE 6 is a sectional view diagrammatically illustrating the apparatus of FIGURE 5, FIGURE 7 is a schematic view of torque apparatus incorporating that of FIGURES 1 and 5, and including apparatus for measuring the transit time between signals and the speed of rotation of the shaft, and FIGURE 8 is a diagrammatic sectional view taken on the line 8—8 of FIGURE 7.

FIGURE 1 illustrates a basic form of shaft torque monitoring apparatus 10 associated with a rotating shaft 12, said apparatus comprising radiators or reflectors 2 and 3 mounted on and rotating with the shaft, and sensors 4 and 5 mounted nearby and in the same rotational planes as radiators or reflectors 2 and 3 respectively. In this example, the sensors include light sources. Each sensor becomes activated and generates a signal when a rotating radiator passes the position of common alignment therewith. Although this invention is described herein using reflectors and light sources, it is to be understood that the invention contemplates utilizing forms of radiant energy other than light, such as nuclear and radio frequency energy. Each sensor in the illustrated embodiment generates an electrical signal when the rotating reflector aligned therewith passes the position of common optical alignment therewith. FIGURE 2 is a sectional view at the instant of a sensor 4 signal, reflector 2 and sensor 4 being in common optical alignment. FIGURE 3 is a sectional view at the instant of a sensor 5 signal, reflector 3 and sensor 5 being in common optical alignment.

In the following, the angular displacements concerned are those in a plane of shaft rotation; in reference to reflectors and sensors, the angular displacements concern optical axes.

It is evident from FIGURE 4 that $$\theta = {_2\theta_3} - {_4\theta_5} \qquad \text{(Equation 1)}$$

where $\theta$ is the angular displacement of the shaft for counterclockwise rotation between the positions and times defined under FIGURES 2 and 3, ${_2\theta_3}$ is the angular displacement between rotating reflectors or radiators 2 and 3, and ${_4\theta_5}$ is the constant angular displacement between fixed sensors 4 and 5.

The applicable expression for rotary motion is $$\theta = wt \qquad \text{(Equation 2)}$$

where $\theta$ is the displacement defined above, $t$ is the time interval between sensor signals and $w$ is the mean angular velocity during time interval $t$.

Substituting for $\theta$ from Equation 1, $$_2\theta_3 - {_4\theta_5} = wt \qquad \text{(Equation 3)}$$

In the above arrangement, the axial disposition of reflectors 2 and 3 delineates a shaft length liable of torsional displacement or twist.

In the following, the subscript "ref" indicates values corresponding to the reference or comparison-base shaft torsion condition; the subscript "test" indicates values corresponding to the working load shaft torsion condition. Let $t^1$ be the time interval between sensor signals for apparatus 10.

For the reference condition, $$_2\theta_{3\text{ref}} - {_4\theta_5} = w_{\text{ref}} t^1_{\text{ref}} \qquad \text{(Equation 4)}$$

For the test condition, $$_2\theta_{3\text{test}} - {_4\theta_5} = w_{\text{test}} t^1_{\text{test}}$$

but $$_2\theta_{3\text{test}} = {_2\theta_{3\text{ref}}} + \Delta_2\theta_3$$

where $\Delta_2\theta_3$ is the change in the torsional displacement of the shaft between reference and test conditions, substituting $$_2\theta_{3\text{ref}} + \Delta_2\theta_3 - {_4\theta_5} = w_{\text{test}} t^1_{\text{test}} \qquad \text{(Equation 5)}$$

Subtracting Equation 4 from Equation 5, $$\Delta_2\theta_3 = w_{\text{test}} t^1_{\text{test}} - w_{\text{ref}} t^1_{\text{ref}} \qquad \text{(Equation 6)}$$

FIGURES 5 and 6 illustrate apparatus 15 which forms part of another embodiment of the invention. In this apparatus, reflectors 2 and 3 on shaft 16 are integrally mounted in a common rotational plane so that the angular displacement between these reflectors has a known and constant value $\theta_k$ (see FIGURE 6). Sensors 4 and 5 are common physically and functionally so that ${_4\theta_5} = 0$. Let $t^{11}$ be the time interval between sensor signals obtained for the apparatus of FIGURE 5.

The desired time interval is that associated with the smaller of the angles $\theta_k$ and $(2\pi - \theta_k)$. A special case relative to the FIGURE 5 arrangement is to be noted, viz., that for which reflectors or radiators 2 and 3 are common physically and functionally whence $\theta_k = 0$ or $2\pi$.

Substituting and re-arranging Equation 3 gives, $$w = \frac{\theta_k}{t^{11}} \quad \text{(Equation 7)}$$

Rewriting Equation 7 for reference and test conditions gives $$w_{ref} = \frac{\theta_k}{t^{11}_{ref}}$$

and $$w_{test} = \frac{\theta_k}{t^{11}_{test}}$$

and substitution in Equation 6 gives $$2\theta_3 = \theta_k \left( \frac{t^1_{test}}{t^{11}_{test}} - \frac{t^1_{ref}}{t^{11}_{ref}} \right) \quad \text{(Equation 8)}$$

being a practical computational equation for the evaluation of torsional displacement from the time-interval data generated by the apparatus.

FIGURES 7 and 8 illustrate a preferred embodiment of the invention. Apparatus 18 is associated with a rotating torque-transmitting shaft 19. Apparatus 18 includes a plurality of sets of light reflectors, and in this example, sets of reflectors 20, 30 and 40 are mounted on the shaft and circumferentially spaced from each other. These sets are disposed at random or deliberate spacing about the circumference of the shaft. Individual reflectors of the various sets are all oriented with their optical axes substantially colinear with shaft radius vectors. Reflector set 20 comprises a first pair of reflectors 21 and 22 disposed axially so as to delineate a shaft length liable to torsional displacement or twist in the plane of rotation. Reflectors 21 and 22 are the equivalent of reflectors 2 and 3 in apparatus 10. In reflector set 20, reflector 21 forms another pair with a reflector 23 integrally mounted therein in a common rotational plane with optical axes at a suitable and fixed angular mutual displacement. Reflectors 21 and 23 are the equivalent of reflectors 2 and 3 of apparatus 10. Two electro-optical sensors 50 and 60 are mounted externally with respect to shaft 19 in rotational planes containing the shaft mounted reflectors 21 and 23 and reflector 22, respectively, each sensor comprising means for directing a collimated beam of light towards its associated reflector or reflectors, and a photoelectric detector adjusted to generate an electrical signal at the instant of common optical alignment with a rotating reflector. Suitable data handling equipment, all well known in the art, include an electronic signal gate 70, cathode ray oscilloscope 71, time interval meters 72 and 73 and a digital recorder 74.

Reflector sets 30 and 40 are duplicates of set 20. Set 30 includes axially spaced reflectors 31 and 32, and another reflector 33 at and arranged angularly relative to reflector 31. Similarly, set 40 includes axially spaced reflectors 41 and 42, and a reflector 43 angularly arranged relative to reflector 41. Pairs of reflectors 21 and 22, 31 and 32, and 41 and 42 are arranged around shaft 19, reflectors 21, 31 and 41 being located in a common rotational plane, while reflectors 22, 32 and 42 are in another common rotational plane. A sensor 50 is spaced from shaft 19 and in the rotational plane of reflectors 21, 31 and 41, and a sensor 60 is positioned in the rotational plane of reflectors 22, 32 and 42 and spaced outwardly from the shaft. Each of these sensors includes a light source, but it is to be understood that, as in the previously described forms of the invention, there may be a light source for each sensor independent thereof. Pairs of reflectors 21–23, 31–33 and 41–43 are arranged in a common rotational plane and are aligned with sensor 50.

Sensors 50 and 60 generate signals during that fraction of a revolution of shaft 19 corresponding to the passage of reflector set 20 past said sensors. Each pair of signals, herein referred to as a first signal pair, generated by the passage of the first pair of reflectors 21 and 22 delineate a time interval $t^1$. Each pair of signals, referred to as a second signal pair, generated by the passage of the second pair of reflectors 21 and 23 delineate a time interval $t^{11}$. During those fractions of a shaft revolution corresponding to the passage of reflector sets 30 and 40, additional signals are generated providing comparable but independent data relevant to torsion conditions at various discreet positions of shaft revolution. Sequential samplings are furnished by the signals generated by each successive shaft revolution.

The signals from the sensors are fed to the electronic signal gate 70 which, employing circuitry well known to the electronic art, selects signal pairs in accordance with the desired order for monitoring. The cathode ray oscilloscope 71 is employed to furnish a useful qualitative display of the signals. Two time interval meters 72 and 73 employing modern digital techniques measure precisely and display values of the time intervals $t^1$ and $t^{11}$. The digital recorder 74, records numerical values of the time interval data. The evaluation of torsional displacement by Equation 8 may be readily achieved manually, or with computational aids.

Of the many attractive features of this torsion meter, the most significant is the use of the parameter "time-interval" to carry the desired information. It is well appreciated among metrologists that, of the basic measurement parameters length, mass, and time, the last "time," can be measured to the greatest resolution with the greatest ease. The parameter, time, is particularly amenable to direct handling by digital techniques with the attendant advantages of rapid data acquisition and high capacity for information storage. Transducers at the earliest stage in the present scheme convert the variable of interest into time-interval data thus avoiding the accuracy degradation associated with the usual chain of analog devices.

The short term sampling feature is of great significance to the investigator of torsional phenomena. Sampling can be programmed for specific shaft positions or synchonized for specific portions of a prime mover or load cycle. Completely valid samplings obtainable independently within a small fraction of the period of revolution of a shaft provide capability for high resolution with a high effective rate of response.

Practical use features of this apparatus include non-contacting transducers (no husks, no slip-rings), low loading, fast installation and the important feature of non-critical adjustment. By establishing a reference or comparison base condition during run-up or run-down of the rotational system under investigation, a significant reduction in errors due to residual and hysteresis torque may be realized. The "zero" adjustment of certain classes of known torsion meters under static conditions usually requires special apparatus and special procedures. The scheme described herein does not anticipate the necessity for establishing reference condition under static conditions.

With knowledge of such constants as the effective axial spacing of reflectors, shaft diameter, and shaft shear modulus additional variables such as surface strain, stress, torque and horsepower can be readily evaluated from well-known relationships involving the value of torsional displacement, the basic parameter monitored by the present torsion meter.

The usual field of application involves monitoring torsional displacement over short shaft lengths for which the torsion meter described has adequate sensitivity and high capability. The scheme has features commending its application to the strength-monitoring (for insipient failure) of shafts where a single pair of axially disposed reflectors could span a number of potentially weak sections.

What I claim as my invention is:

Apparatus for monitoring torsional phenomena of a rotating shaft under conditions of varying speed and torque, comprising first and second reflectors adapted to be secured in axially spaced relationship to a shaft to be tested, a third reflector in a common rotational plane with the first reflector and set at a predetermined angle thereto in said connom plane, a light source for and in alignment with the second reflector, a light source for and in alignment with the first and third reflectors, first electro-optical sensor means spaced radially from the shaft for and in alignment with the first and third reflectors, second electro-optical sensor means spaced radially from the shaft for and in alignment with the second reeflctor, each of said sensor means being positioned to be actuated by light reflected by the respective reflector to said sensor means, said first and second sensor means generating first pairs of electrical signals when the first and second reflectors respectively pass the positions of common optical alignment therewith to indicate a time interval between said signals of each first pair, said first sensor means generating second pairs of signals when the first and third reflectors pass the respective positions of common optical alignment to indicate a time interval between the said signals of each second pair, and means operated by each of said pairs of signals to measure said time intervals between the signals of each of said pairs, said interval between the signals of each first pair being a function of the torsional displacement of the shaft and the time interval between the signals of each second pair being a function of the rotational velocity of the shaft; said means operated by said pairs of signals comprising an electrical signal gate connected to the two sensor means for selecting pairs of signals in accordance with a predetermined order for monitoring, and two time interval meters connected to the gate adapted to measure the time intervals between the respective signals of the two pairs of signals.

References Cited by the Examiner

UNITED STATES PATENTS

| 2,586,540 | 2/1952 | Holden | 73—136 |
| 2,640,352 | 6/1953 | Ellison et al. | 73—136 |
| 3,049,003 | 8/1962 | Felder | 73—136 |

FOREIGN PATENTS

| 600,980 | 4/1948 | Great Britain. |

RICHARD C. QUEISSER, *Primary Examiner.*

C. A. RUEHL, *Assistant Examiner.*